(12) United States Patent
Meier et al.

(10) Patent No.: US 11,889,390 B2
(45) Date of Patent: Jan. 30, 2024

(54) SYSTEM FOR MONITORING A STATE OF OCCUPANCY OF A PRE-DETERMINED AREA

(71) Applicant: ROOMZ S.A., Fribourg (CH)

(72) Inventors: Roger Meier, Granges-Paccot (CH); Patrick Terreaux, Bulle (CH)

(73) Assignee: ROOMZ S.A., Fribourg FR (CH)

( * ) Notice: Subject to any disclaimer, the term of this patent is extended or adjusted under 35 U.S.C. 154(b) by 423 days.

(21) Appl. No.: 17/294,939

(22) PCT Filed: Nov. 18, 2019

(86) PCT No.: PCT/EP2019/081632
§ 371 (c)(1),
(2) Date: May 18, 2021

(87) PCT Pub. No.: WO2020/104366
PCT Pub. Date: May 28, 2020

(65) Prior Publication Data
US 2022/0022012 A1    Jan. 20, 2022

(30) Foreign Application Priority Data

Nov. 19, 2018   (EP) .................................... 18206949

(51) Int. Cl.
*H04W 4/33* (2018.01)
*H04W 4/38* (2018.01)
*H04W 4/029* (2018.01)
*H04W 4/021* (2018.01)

(52) U.S. Cl.
CPC ............. *H04W 4/33* (2018.02); *H04W 4/021* (2013.01); *H04W 4/029* (2018.02); *H04W 4/38* (2018.02)

(58) Field of Classification Search
CPC ....... H04W 4/33; H04W 4/021; H04W 4/029; H04W 4/38

USPC ....................................................... 455/456.1
See application file for complete search history.

(56) References Cited

U.S. PATENT DOCUMENTS

| 9,646,482 | B1 * | 5/2017 | Herman | ............... G08B 25/008 |
| 2012/0086568 | A1 * | 4/2012 | Scott | ...................... G05B 15/02 |
| | | | | 340/501 |
| 2021/0071972 | A1 * | 3/2021 | Deng | ...................... G01S 19/34 |

FOREIGN PATENT DOCUMENTS

| EP | 3 357 420 | 8/2018 |
| WO | WO 2017/108408 | 6/2017 |

OTHER PUBLICATIONS

Written Opinion issued in PCT/EP2019/081632 dated Jan. 23, 2020.
International Search Report issued in PCT/EP2019/081632 dated Jan. 23, 2020.

* cited by examiner

*Primary Examiner* — Thomas J Lett
(74) *Attorney, Agent, or Firm* — DLA PIPER LLP (US)

(57) ABSTRACT

The present invention relates to the management of shared work spaces. A goal is to accurately reflect the actual status of a booking as close to real time as possible. Embodiments of the invention allow for low-power, battery operated, motion sensor devices to report the actual status of shared work spaces to a centralised server using existing wireless communications means in the environment where the shared work spaces are to be managed.

11 Claims, 4 Drawing Sheets

SYSTEM FOR MONITORING A STATE OF OCCUPANCY OF A PRE-DETERMINED AREA

CROSS REFERENCE TO RELATED APPLICATIONS

This application is a U.S. National Stage Application of International Application No. PCT/EP2019/081632 filed Nov. 18, 2019, which claims priority from European Patent Application No. 18206949.2 filed Nov. 19, 2018. The entirety of all the above-listed applications are incorporated herein by reference.

TECHNICAL DOMAIN

The present inventive concepts relate generally to the domain of the management of the occupation of spaces, especially workspaces. More particularly, these concepts find use in systems and methods for managing and reporting on the use of areas such as office spaces, conference rooms, work areas or public spaces.

BACKGROUND

Cameras have often been used for providing real-time monitoring capability in public areas. Camera footage can also be recorded for off-line viewing or analysis. Systems including a camera and image processing capabilities have been used to provide accurate, automated, monitoring of presence in an area and provide a high level of accuracy. However, depending on the type area being monitored, cameras have their drawbacks. One problem is that they generally require a rather complex infrastructure including power cables and data cables. The amount of data to be transmitted from the camera to a centralised server is usually high enough to warrant the installation of such physical cables. The infrastructure may therefore be somewhat costly. The cameras themselves may also be costly. Another problem is the invasion of privacy. Cameras provide a great amount of detail of the space they monitor, usually allowing for individual persons to be identified. Depending on the situation, identification of personnel may be undesirable at best, illegal at worst.

Electronic badge systems for access control provide a means for monitoring the presence of personnel within certain areas. Like cameras, badge systems usually allow for the detected personnel to be identified, which is not desirable in a situation where anonymity is to be guaranteed.

Noise measurement systems for detecting presence may also be used and may be configured to maintain anonymity as regards any possible identifying characteristics of the detected sounds.

Other means for detecting presence include pressure sensors such as pressure mats. This type of presence detector has the advantage that it is anonymous regarding the identity of a detected presence.

Another known method for monitoring the state of occupancy of a space is to place a presence sensor at that space. Known presence sensors include motion sensors and heat sensors such as passive infra-red (PIR) sensors, which are sometimes referred to as passive infra-red detectors (PID). The word "passive" refers to the fact that such sensors do not radiate the IR energy for detecting presence. Instead, they rely on IR radiation being emitted by or reflected from the objects whose presence is to be detected. PIRs can be used to provide information concerning the presence or absence of a being at the space within the range of the sensor. Typically, the range of a PIR sensor is around 25 to 30 square metres. Consequently, the resolution of the information provided by a presence sensor is rather low, equivalent to 1 pixel of information representing presence or no presence in the respective space. The 1 pixel of information which a passive sensor such as a PIR can provide is the information of whether a presence or a movement has been detected or not. A passive IR sensor cannot provide information on who or what moved. Consequently, the bandwidth or resolution of the information provided by the PIR, compared to say a camera, is limited by many orders of magnitude. In order to provide further information, which would represent more than just the 1 pixel of information referred to above, an active sensor would be required.

Active sensors, as opposed to passive IR sensors, are any sensors which emit radiation in order to detect a movement or a presence. Such sensors therefore require more energy than passive sensors and therefore generally are less suited for low-power battery operation. Examples of active sensors include active infrared sensors or ultrasonic detectors, which emit radiation for the purpose of detection.

Cameras are known to be used as presence sensors, for example visible light cameras or infrared cameras, which provide images using thermal radiation. Cameras build up an image of the area being monitored, requiring many pixels of information. The information usually has to be processed in order to provide motion detection information capability, such processing usually being done using a locally integrated processor, which generally requires a substantial amount of power. Otherwise, the image data gathered by the sensor may be passed to a server for processing, but again the communications hardware required for this is extremely power intensive.

Passive IR sensors therefore require substantially less power than other types of sensors mentioned above, which allow them to be readily used in low-power, battery-operated, applications. However, they provide a very limited amount of information, as mentioned above: one pixel. A single pixel can be described as being of very low resolution.

It is not unusual in a modern office to find presence sensors under the desks to allow the facility manager to understand the level of occupation of each desk over a given period. In order to monitor a whole facility in this way, the cost and complexity of installing a very large number of such sensors may become prohibitive.

BRIEF SUMMARY OF THE INVENTION

According to a first aspect, provision is made for a system for monitoring a state of occupancy of a pre-determined area by at least one live presence. The system includes a first sensor comprising a first time counter. The first sensor is configured to detect at least one movement of a live presence within a first pre-determined zone within the pre-determined area and it is further configured to maintain a first log comprising, for each movement detected by the first sensor, a corresponding first event timestamp having a value which is based on a value of the first time counter when said movement within the first pre-determined zone is detected. Also included in the system is at least one second sensor comprising a second time counter. The second sensor is configured to detect at least one movement of a live presence within a second pre-determined zone within the pre-determined area and it is further configured to maintain a second log comprising, for each movement detected by the second sensor, a corresponding second event timestamp having a value which is based on a value of the second time counter when said movement within the second pre-determined zone is detected. Finally, the system also includes a server configured to receive the first and second logs via a wireless communications network, the first and second sensors further configured to attach or otherwise insert, respectively, a first and a second send timestamp to their corresponding logs, the first and second send timestamps having values derived from their respective time counters when the respective logs are sent, the server being further configured to analyse the first and second logs to provide the state of occupancy of the pre-determined area. In particular, the server has access to a reference time counter as well as to topographic information concerning at least the first and second pre-determined zones. The first, second and reference time counters are configured to count at substantially a same frequency. Notably, the first sensor and the further sensor are battery-operated passive infra-red motion sensors. The analysis performed by the server includes combining the topographic information of the first and second pre-determined zones and the timestamps once they have been synchronised by converting them to the reference time counter.

Before the sensor sends its log to the server, a further event or movement detected by the sensor may also have its corresponding event timestamp recorded in the log. This would be a still further event timestamp. All of these data would have the same send time when the sensor sends the log to the server. Other sensors in the system would have their corresponding data, e.g. second timestamps or third timestamps corresponding to detected movements, or events, detected by their respective sensors and the times when the logs containing all of the respective events and their corresponding event timestamps are sent to the server.

According to another aspect, disclosure is made of a method for monitoring a state of occupancy of a pre-determined area. The method includes receiving a first report of a time when a movement was detected within a first pre-determined zone within the pre-determined area from a first motion sensor, the first report including a time when the movement was detected according to a local real-time clock of the first sensor and a message delivery time for the first report according to the local real-time clock of the first sensor, the first sensor being a battery-operated passive infra-red motion sensor. The method further includes receiving a second report of a time when a movement was detected within a second pre-determined zone within the pre-determined area from a second motion sensor, the second report including a time when the movement was detected according to a local real-time clock of the second sensor and a message delivery time for the second report according to the local real-time clock of the second sensor, the second sensor being a battery-operated passive infra-red motion sensor. According to the method a comparison is made of the message delivery time for the first report with a reference clock at the time of delivery and the result of the comparison is used to calculate the time that the movement was detected by the first sensor in terms of the reference clock. A comparison is also made of the message delivery time for the second report with the reference clock and the result of this second comparison is used to calculate the time that the movement was detected by the second sensor in terms of the reference clock. A check is made in a database having topographic data related to the first and second pre-determined zones in order to determine whether the first and second sensors have overlapping footprints. If the footprints do overlap, then if the two movements have the same reference time then they are considered to have been caused by a same live presence located in the overlap region. If the footprints do not overlap, then two movements having the same reference time are considered to have been made by two separate live presences. If the two movements have different reference times, then they are considered to have been caused by two separate live presences and to have occurred at a place where the two footprints do not overlap should the footprints overlap.

BRIEF DESCRIPTION OF THE DRAWINGS

The inventive concepts described herein will be better understood thanks to the detailed description which follows and the accompanying drawings, which are given as non-limiting examples of embodiments of the inventive concepts, namely.

DETAILED DESCRIPTION

Within an office environment, there is a need to manage the use of shared spaces such as work areas, meeting rooms, conference halls and the like. In a modern office environment, especially where newer practices of desk-sharing and hot-desking are employed, desks and other workspaces or informal meeting areas and breakout areas also fall into the category of shared spaces. It is the facility manager's task to optimise the use of costly real-estate to ensure the best and most cost-effective use of all of the spaces within his or her facility. Once a floorplan has been adopted within a facility, it is also the facility manager's job to monitor the use of the different spaces and to adapt the use of such spaces to any changing needs which may be observed through such monitoring.

Figure 1A:
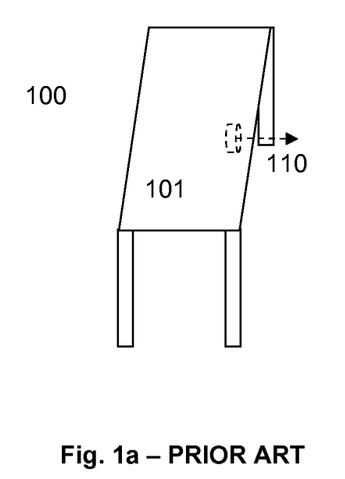
FIG. 1a, illustrating an office desk with a presence detector installed according to state-of-the-art technology.

FIG. 1a shows a configuration for monitoring a presence status at a particular desk 101 within an office 100. In the scenario of FIG. 1a, a presence detector 110 is placed under the desk 101. When someone sits at the desk, within the sensitivity range of the presence detector, the presence detector indicates that the desk is occupied and when no one is at the desk the presence detector indicates that the desk is free. In a situation where the office has four desks, for example, in order to provide information on the status of occupancy of any of the desks, then it would be necessary to place one detector under each of the four desks. The state of occupancy of any of the desks is then given by its respective detector.

Figure 1B:
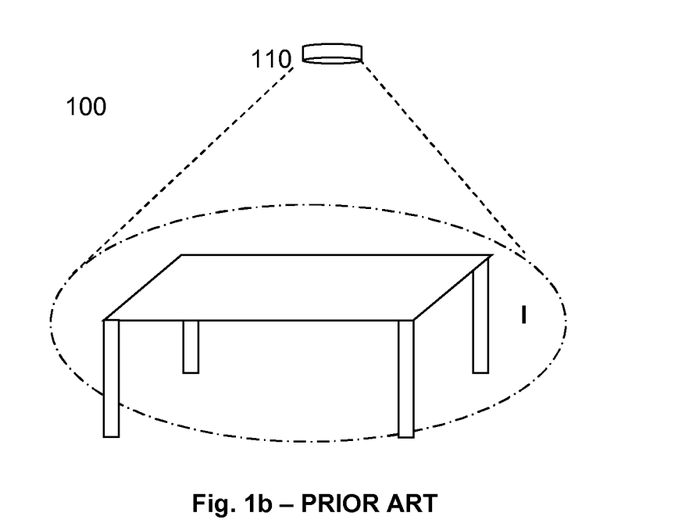
FIG. 1b, illustrating another state-of-the-art scenario in which a presence detector is installed on the ceiling of an office or conference room.

Instead of placing the detector under a desk, it is possible to place the detector on the ceiling of an office for example, thus providing information as to the state of occupancy of the office or at least of part of the office. FIG. 1b shows an office 100 with a single presence detector 110 placed on the ceiling in the centre of the office. The presence detector has a pre-determined footprint I, or sensing range, which covers a pre-determined part of the office. A desk 101 placed in the centre of the office, within the footprint I of the sensor 110, can therefore provide information regarding the state of occupancy of the office 100, or at least near the desk 101, within the sensitivity range I of the sensor 110. Presence detectors such as the one illustrated in FIG. 1b are known in the state of the art. Such presence detectors may detect movement or may detect heat. A presence detector can therefore provide information as to whether movement has been detected or heat has been detected, which translates to whether or not a presence has been detected, usually a human presence. Such information is of a go/no-go nature, presence/absence, occupied/free. In other words, such information is of a binary nature. A single detector therefore provides one bit of information, whose value can be one or zero. Thus, it can be said that the presence detector provides information as to the state of occupancy of a pre-determined space which is its detection range. Another terminology which conveys the same meaning is a presence status. The state of occupancy of a pre-determined space may be occupied or free, for example. This is an anonymous piece of information in the sense that when the space is occupied, it is not known who occupies the space.

In the example shown in FIG. 1b, the space to be monitored is simply an office or a conference room, with a presence detector suitably placed to monitor the state of occupancy of the room. Had there been four desks in the room, with the detector's footprint covering all of the desks, when the detector indicates that the space is occupied, this can be interpreted as meaning that either one or more of the desks is occupied.

Embodiments of the present invention provide for the ability to understand the actual use of real estate within a whole facility rather than just a particular office or a number of desks equipped with presence sensors. Different types of spaces have different uses and a facility manager needs to know how efficient the use of each space is in order to be able to re-arrange the floorplan of the facility to better occupy the available real estate. For example, the facility manager may need to choose whether a particular floor is better suited for hot-desks and break-out areas or whether indeed hot-desks are best placed in the same area on a particular floor. Analytical studies are also possible, allowing the facility manager to evaluate what percentage of seating desks versus stand-up desks is best, and so on. The monitoring required for this may involve monitoring substantially all of the facility, including all of the different floors. Embodiments of the invention also allow for more precise monitoring to be provided in the single office scenario described above.

According to an embodiment of the present invention, a plurality of motion sensors is used to monitor the states of occupancy of a plurality of zones with respect to a particular time, notably a time local to the motion sensor, as indicated by a local time counter of the sensor. Each of the sensors is configured to provide information on a presence status within its sensitivity range with respect to a time local to the respective motion sensor, as indicated by a local time counter of the respective sensor. A processor, preferably a central processor, remote from the sensors, is provided to collect and combine the information from the plurality of sensors for analysis. Consequently, the size of the overall footprint being monitored is increased as it is a combination of the footprints of each of the individual sensors, while the overlapping of the different zones provides an opportunity for providing detailed information about presence without forfeiting anonymity when different sensors detect presence at a same time. The system allows to ascertain whether occupancies detected by different sensors may be attributable to a same presence.

Embodiments of the present invention not only allow for large facilities to be monitored, they also allow for a more precise monitoring of a particular space to be provided. The combination of the information from different sensors allows for more accuracy to be obtained.

Motion sensors, according to embodiments disclosed herein, may be any of the known presence sensors or presence detectors such as motion detectors or temperature sensors. Suitable temperature sensors include PIRs. A PIR is designed to measure a heat level and generally may include optics to provide a multi-faceted view of the space being measured. Consequently, when a heat source (for example a person) moves, the PIR detects the source of the heat moving from one facet to another. A PIR can therefore be said to detect presence when a heat profile indicates the presence of a heat source, such as a person, and it can be said to detect movement by detecting motion of the heat source. Known PIRs are able to detect minute movements of a person. The natural, unavoidable movements of a person sitting at a desk, even though they are small, are sufficient to cause the PIR installed at the desk, or on the ceiling, to detect the presence or motion. A PIR can therefore be said to be a motion sensor. In embodiments of the present invention, a PIR may be used to monitor a state of occupancy of an area within its detection range, where the area is said to be occupied when a heat profile detected by the PIR shows the presence of a heat source and it may also be used to trigger or register an event when the heat source is detected as having moved. The area may be said to be unoccupied when the heat profile detected by the PIR indicates an absence of a heat source. Motion sensors used in embodiments of the present invention can detect movement or presence of a body which generates heat. They can therefore be used to monitor the state of occupancy by a live presence within their detection area.

Different types of combinations of the sensor data may be employed. For example, if a very large room were to be monitored, or a collection of rooms and corridors, then a number of sensors could be arranged to cover a pre-determined area or floorplan. The placement of the sensors may be designed so that substantially all parts of the room, or rooms and corridors, may be covered. The occupancy status data from the sensors may be logically OR-ed in order to know whether the area is occupied or not. The pre-determined area is an area which includes the coverage areas of all of the sensors. Some parts of the pre-determined area include sub-zones representing overlaps in footprints of two or more sensors. By performing a logical AND of the occupancy status data from the sensors, further information may be deduced regarding the parts of the floorplan which are monitored by a plurality of sensors whose footprints overlap. By careful design of the overlap regions, the occupancy status information relating to the overlap areas may take on a particular significance, especially when the time when occupancy status is noted is also taken into consideration.

Figure 2:
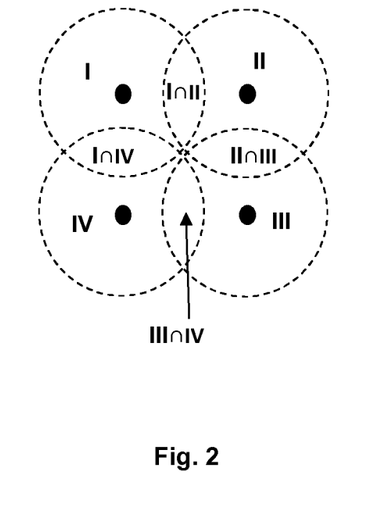
FIG. 2, showing sensitivity maps or footprints of a plurality of motion sensors arranged in a configuration according to an embodiment of the present invention.

FIG. 2 shows a plan view of a room having four motion sensors placed on the ceiling, each sensor being represented as a dot 110, 120, 130, 140. The footprints showing the detection range of each of the sensors are also shown as dashed circles I, II, III, IV around their respective sensors. In total it can be said that there are eight zones: four zones I, II, III, IV which are each covered by a respective single sensor 110, 120, 130, 140; and four zones, or sub-zones, I∩II, II∩III, III∩IV, I∩IV which represent overlaps of the detection ranges of two different sensors.

Figure 3:
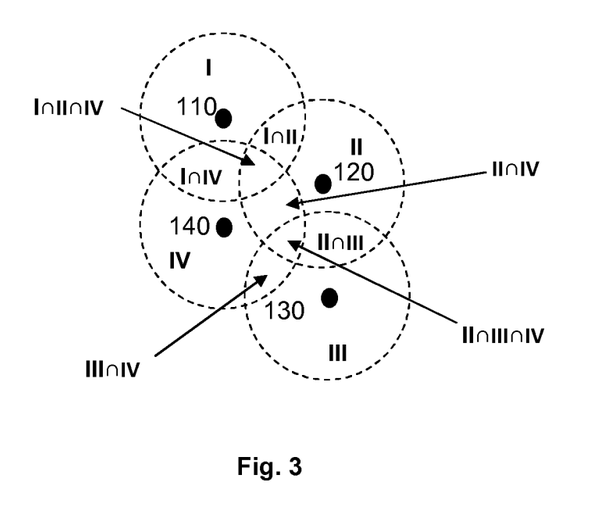
FIG. 3, showing footprints of a plurality of motion sensors arranged into another configuration according to an embodiment of the present invention.

FIG. 3 shows a large area being monitored by four motion sensors whose placement has been designed to provide a floorplan having a more complex combination of footprints. Eleven zones can be seen: four zones each monitored by a single sensor I, II, III, IV; five zones, or sub-zones, covered by the overlapping footprints of exactly two different sensors I∩II, II∩III, III∩IV, I∩IV, II∩IV; and two zones, or sub-zones, covered by the overlapping footprints of three different sensors I∩II∩IV, II∩III∩IV. Further, more complex, combinations of the footprints can lead to even more zones being defined: for example, a zone can be said to be formed by the footprint of sensor 110 but excluding the footprint of sensor 120; another zone may be said to be formed by a combination of the overlap of the footprints of sensors 120 and 130 but excluding the footprint of sensor 140; another zone may be formed by an exclusive-NOR combination of the footprints of sensors 120, 130 and 140; and so on. Zones may therefore be defined by any type of combination of the footprints of the sensors in the system, such as logical AND, XOR, NOR, XNOR, or etc.

According to embodiments of the present invention, careful design of the overlapping footprints of a plurality of motion sensors, combined with processing of the occupancy status information provided by plural motion sensors, when related to time, allows for a substantial increase in the effective temporal and spatial resolution of the monitoring system while satisfying the requirement of anonymity mentioned above. For example, in FIG. 3, sensor 110 has a footprint represented by zone I, sensor 120 has a footprint represented by zone II, senor 130 has a footprint represented by zone III and sensor 140 has a footprint represented by zone IV. The footprints overlap with each other, as shown. The four sensors, according to an embodiment of the present invention, are each equipped with a real-time clock. At time t0, no one is present in any of the zones I through IV. A person approaches the area covered by footprint I and is detected by sensor 110 at time t1. The person moves towards zone II and reaches the area where zones I and II intersect at time t2, when sensor 110 still detects the presence and sensor 120 registers the presence, or motion, for the first time. Sensor 110 may then register a positive state of occupancy and store this in a memory within the sensor along with the time t1 that motion was first detected, as indicated by the sensor's real-time clock. As soon as the person reaches the region where zones I and II overlap, sensor 110 will detect a motion and may register the positive occupancy status along with the time t2 the motion was detected according to its real-time clock. Since the person has not yet left zone I, sensor 110 still detects the presence in the form of a movement of the person at time t2. The system according to the embodiment of the invention can then provide the information that since zone I is occupied at time t1 and the overlapping region between zones I and II becomes occupied at time t2 while the remaining zones remain unoccupied, there is at least a very high probability that the person who was present in zone I is moving towards zone II. As the person continues towards the centre of zone II, there will become a point in time t3 when sensor 110 will no longer register a presence as it will stop sensing any motion. For sensor 110, at this time t3 the occupancy status will switch to the opposite state, indicating absence or non-occupancy, while sensor 120 will continue registering a state of occupancy due to the movement of the person. Sensor 110 may then store the change in status along with the time according to its real-time clock that the absence was detected. The system according to the embodiment of the invention can thus provide information that a person has crossed from zone I entirely into the part of zone II where there is no overlap with zone I.

According to an embodiment, a monitoring system is provided, comprising a plurality of motion sensors equipped to register events and a corresponding time when each event occurs according to a time counter, such as a real-time clock, local to the motion sensor. An event may be a first time that a presence is detected, indicating an arrival of a person within the sensitivity range of the sensor, or a time when a presence is no longer detected, indicating that a person has left the sensitivity range of the sensor, or a time when a movement is detected or a combination of all three scenarios. In more general terms, an event may be said to be a movement, i.e. a detection of motion. According to embodiments of the present invention, the sensor has a memory in which it stores a log comprising one or more timestamps corresponding to each event that it detects. Such timestamps are a first type of timestamp and are known as event timestamps. For each sensor in the system each new event detected by the sensor also has its corresponding event timestamp in the log in the memory of the sensor.

The motion sensors each have a pre-determined footprint corresponding to its sensitivity range. The sensors are placed within a pre-determined area, such that the footprints of two or more sensors overlap at one or more zones within the pre-determined area. Each of the sensors is communicably connected to a centralised server, for example by a wireless radio connection. The centralised server stores a floorplan which may include the identifiers, positions and footprints corresponding to each of the sensors.

Going back to the example arrangement of motion sensors of FIG. 3, which could be representative of a motion sensor configuration according to an embodiment of the present invention, since motion sensors exist which are sensitive to minute movements of a person even just sitting at a desk for example, by having a centralised server collect and analyse event data from the logs sent by the motion sensors, the event data including the event timestamp indicating that a motion at a sensor occurred, the value of the event timestamp corresponding to the local time, as given by the sensor's real-time clock. The log from a sensor also includes or is at least linked to a send timestamp, corresponding to the time, as indicated by the sensor's local time counter, that the log was sent to the server. Thus, it becomes possible to monitor areas with many desks by using relatively few low-cost sensors mounted on the ceiling for example. In FIG. 3, the sensors may for example be attached to the ceiling, with their sensitivity footprints as shown by zones I through IV, overlapping at given places. In this example, it is to be assumed that the footprints of the four sensors cover an area where many desks are situated. At time t1, according to the server's reference time counter, a person sitting in zone I may be detected by sensor 110. Sensor 110 may record the event as an event timestamp in its log by storing a corresponding event timestamp having a value of whatever the sensor 110's time counter indicates at reference time t1 when it detects a small movement of the person. The event timestamp in this first sensor's log thus has the value of the first sensor's time counter when the event was detected. Two people may be sitting in the overlap area of zones I, II and IV, and another two people may be sitting in the overlap area of zones I and II. At time t2, according to the server's reference time counter, sensor 110 may register an event as well as sensors 120 and 140, meaning that a person, or people, are detected at the overlap of zones I, II and IV. The new event may be recorded in the three sensors' logs as event timestamps having values corresponding to the time the event was detected according to the respective local time counters in each of the sensors. At reference time t3, sensors 120 and 140 might record an event, meaning that a presence in the overlap of zones II and IV has been detected. Again, the event of time t3 may be recorded in the two sensors' respective logs using event timestamps having values corresponding to, or otherwise derived from, the time the t3 event was detected according to the respective local time counters in each of the sensors. The sensors will send their respective logs to the centralised server at some time and will record a send timestamp, either in the log or as an attribute of the log, having a value derived from the time that the log was sent to the server, according to the sensor's respective time counter values when the logs were sent. By combining the event timestamp information and the send timestamp information from the various sensors by a centralised server having a reference time counter and using this to calibrate the times of the events with respect to a reference time counter, many desks can be monitored with few low-power, low-cost, autonomous, sensors mounted on the ceiling. The locations for the placement of the sensors can be easily modified to account for different desk placements and floorplans to provide the optimum result.

As mentioned above, combinations of the information from different sensors can be made based on logical OR, logical AND or logical XOR. Further combinations are possible, such logical NOR, logical XNOR and so on.

According to all embodiments of the invention battery-operated passive infra-red motion sensors are used (PIR), thus allowing for the floorplan to be modified as required by adding sensors at certain location within the pre-determined area to be monitored without having to provide any additional wiring to connect the sensors to each other or to a server. Of particular note, such sensors should be able to operate over periods of several years without having to change the battery. Consequently, every effort is employed to ensure an efficient use of power in the sensors. For sensors which are configured to communicate with a centralised server, as in the present invention, it is known that a major contributor to power consumption is the communications module for providing communication between the sensor and the server. For this reason, the sensors are configured to locally store a log of the events it detects, the log comprising an event timestamp corresponding to the event which is detected, the event timestamp having a value which is derived from the value of the sensor's local time counter when the corresponding event is detected. The sensors are further configured to upload their logs to the centralised server from time to time and to include, either in the log or linked to the log, a send timestamp having a value derived from the sensor's local time counter when the log is sent to the centralised server. The uploads to the centralised server may happen at pre-determined intervals or at pre-determined times. The event timestamps and send timestamps recorded in, or otherwise related to, a log may comprise a time when an event occurred according to the sensor's time counter, i.e. a time when a movement was detected and a time when the log was sent to the centralised server, according to the sensor's time counter. The upload could happen once or twice a day for example, or even less, thus conserving battery power.

Being battery-operated and having to operate using very little power, every effort is made to reduce the amount of processing the motion sensor has to do. Consequently, the motion sensors used in embodiments of the present invention are not required to provide DSP processing when a motion is detected or to provide any analysis of the movement that it detects. Notably, the sensors are not required to do any image analysis. All the sensor has to do is record a logical status value indicating presence vs no presence or movement vs no movement within its range. The motion sensors may therefore be simple passive infra-red motion sensors whose function is merely to provide information that something moved at a given time. No further processing of the object which caused the detection of the motion is required. This is referred to, in the present document, as providing 1 bit of information or 1 pixel of information.

Compared with cameras, which take a two-dimensional image of objects within the field and which then may either transfer the image they capture to a server for analysis, which is costly in terms of power, or locally perform some power costly analysis on the image data in order to synthesise it so that only a, hopefully less bandwidth intensive, result of the analysis can be transferred to the server, the passive infra-red motion sensors used in the present invention can be said to provide a one-dimensional piece of information, which is substantially less bandwidth intensive to transfer and which does not need intensive processing locally at the motion sensor. Hence, embodiments of the present invention provide for a viable battery-operated solution. The resolution which can be said to be lost in comparison with a deployment of camera-based sensors, is regained by the centralised processing of the single pixels of information coming from the various battery-operated PIRs in the system.

With the information corresponding to the detected events and the event timestamps of those events along with the send timestamps when the sensors send their logs to the server, and with the knowledge of the location of each sensor and their corresponding footprints and overlap zones, the centralised server can monitor presence at different parts of the facility and can monitor the changes in presence and work out the movements of people between the different zones. As the number of overlapping zones increases, so the accuracy of the system increases. Similarly, as the number of zones which overlap each other increase, so the resolution of the system increases, without compromising the anonymity of the system. For example, in FIG. 3, if sensor 110 registers a presence, then at some time later sensor 120 registers a presence, the probability that the person has moved from zone I to the overlap between zones I and I is substantially high: high enough to take it to be true. If, at a later time again, sensor 140 also indicates a presence, it is very likely that the person has moved to the intersection of zones I, II and IV. If, at a still later time, sensors 110 and 120 both indicate that there is no longer a presence, with no change being registered by sensor 140, then there is a high chance that the person has moved out of the intersection and entirely into zone IV. For people seated at desks, a presence detected by one sensor may be reconfirmed by any number of sensors detecting presences and whose footprints overlap with the part of the first sensor's footprint where the person or people are sitting.

The server may have access to a database comprising, for each of the sensors, its location and the geographical coverage of its footprint. Thus, having knowledge of all the footprints, the server has knowledge of the overlaps of the footprints of the sensors. The server can thus be said to have access to location data relating to the footprints and therefore has geographical knowledge of the footprints, which allows for spatial analysis of the footprints to be performed in order to work out where any overlaps between footprints occur. The database may contain location information for each sensor and the physical coverage of their respective footprints. Such information may be in the form of a map covering the pre-determined area for example, showing the physical location of each sensor and the locus of its corresponding footprint.

Figure 4:
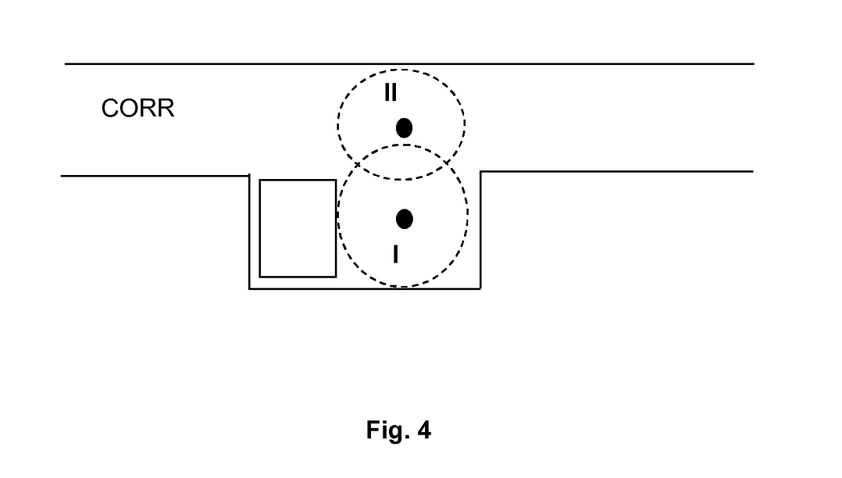
FIG. 4, showing footprints of a plurality of motion sensors in still another configuration according to an embodiment of the present invention.

FIG. 4 shows a corridor CORR which opens out, at a portion roughly half way along its length, into a wider are, which may be used as a breakout area for example. By careful design of the placement of a number of sensors, two in this case, the occupancy status of the breakout area can be monitored by a first sensor. A second sensor may be used to monitor the state of occupancy of a part of the corridor close to the breakout area. By designing the placement of the sensors such that the footprints of the first and second sensors overlap, further information can be gathered about a movement detected in the corridor. For example, did the person who was detected in the corridor by the second sensor then cause a movement to be detected by the first sensor, entering the breakout area at the intersection of the footprints of the second and first sensors? Did that person then leave the overlapping zone and enter the breakout area covered by the first sensor alone? Or did the person detected in the corridor simply pass through the corridor without being detected by the either of sensors?

Still referring to FIG. 4, if only one sensor were present, covering footprint I, then if someone walks past in the corridor the sensor might detect that presence and wrongly report that the desk shown in the figure, near footprint I, is occupied. By having the two sensors with their footprints I and II overlapping as shown, a more accurate reflection of the reality may be provided. If motion is detected only in footprint II or in the zone where footprints I and II overlap, then after analysis of the information received from the sensors it can be concluded that someone walked by. Only when the sensor covering footprint I reports the presence alone, without the other sensor reporting a presence, will the analysis lead to the correct conclusion that the part where the desk lies is occupied. By judicious placement of the second sensor with footprint II, any false alarms triggered by the first sensor will be masked by the second sensor. Thus, a more confined, or precisely delimited, target zone may be defined by adding appropriately located sensors to reduce the possibility of a sensor giving false positives. The target zone is deemed to be occupied when the analysis shows that one sensor exclusively, or a group of sensors, depending on the configuration, detects a particular presence.

Figure 5:
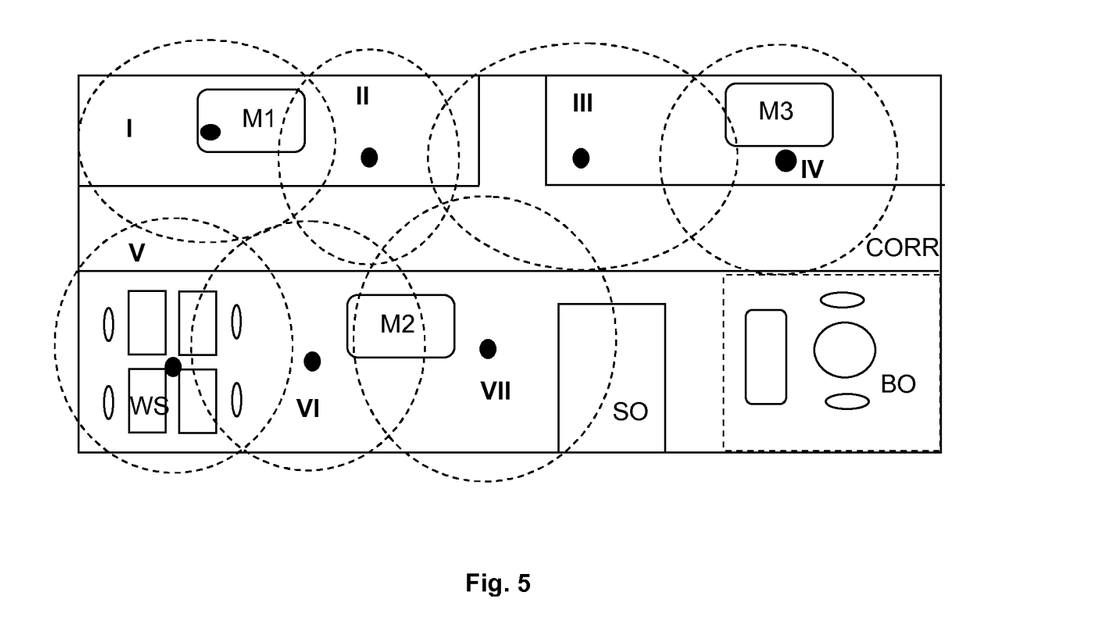
FIG. 5, showing a plan view of an office environment having various working areas, each having different uses, in which an embodiment of the present invention may be deployed.

FIG. 5 shows a more complex example of sensor placement according to an embodiment of the present invention, where the sensors are deployed in order to cover a corridor CORR providing access to a shared desk area WS, three different meeting rooms M1, M2, M3, a breakout area BO and a single-occupancy office SO.

As mentioned above, sensors used in a system according to embodiments of the present invention are each equipped with a real time clock and configured to provide a record of events and their corresponding event timestamps and send timestamps according to their respective time counters. An event may be a movement within the sensor's footprint or sensitivity range. A list of such events and their corresponding event timestamps may be stored locally in a log in a memory of the sensor device for later uploading to a centralised server, whereupon the log will receive a corresponding send timestamp derived from the local time counter. The quantity of data in the log to be transmitted is small and so the connection need only be maintained for a very short period. The data transmitted to the server may include an identifier of the sensor and a list of events and their corresponding timestamps according to the sensor's time counter that the event occurred as well as send timestamps corresponding to the time that the data is transmitted according to the sensor's time counter. The centralised server may include, or at least have access to, a processor for analysing the data received from the sensors.

The centralised server is configured to analyse the received logs. Such analysis includes correlating events occurring in the overlapping parts of two or more sensor footprints. In order to provide a high level of confidence that an event triggered at more than one sensor in a zone in which the footprints of the sensors overlap, the centralised server has to be able to correlate the timestamps to a reference time base. One way to do this, according to an embodiment, is to effectively synchronise the time counters in all of the participating sensors through calculation.

Depending on how it is achieved in the state of the art, synchronising the time counters in all of the sensors may have a drawback in systems in which power saving is important because synchronising generally requires a significant amount of energy to establish the necessary communication links. According to another embodiment of the present invention, the centralised server is used to ensure that the timestamps from all of the sensors can be correlated to a single reference time-base. In this embodiment, physical synchronisation of the counters, or real-time clocks, is not required. Thus, the real-time clocks (time counters) in the sensors need only count at substantially the same frequency in order for the system to work correctly. Even when it is required to alter the floorplan and add one or more sensors to the system, the new sensor's real-time clocks need not be synchronised and may instead be left to run freely. The counting units used by the real-time clocks may be seconds or any other arbitrary units, as long as it is the same for all sensors and the reference clock. Furthermore, the system according to the embodiment is not affected by system delays such as delays affecting communications between the sensors and the centralised server because the events are associated with their corresponding timestamps and the timestamps allow the centralised server to link all events back to a single reference time base.

Figure 6:
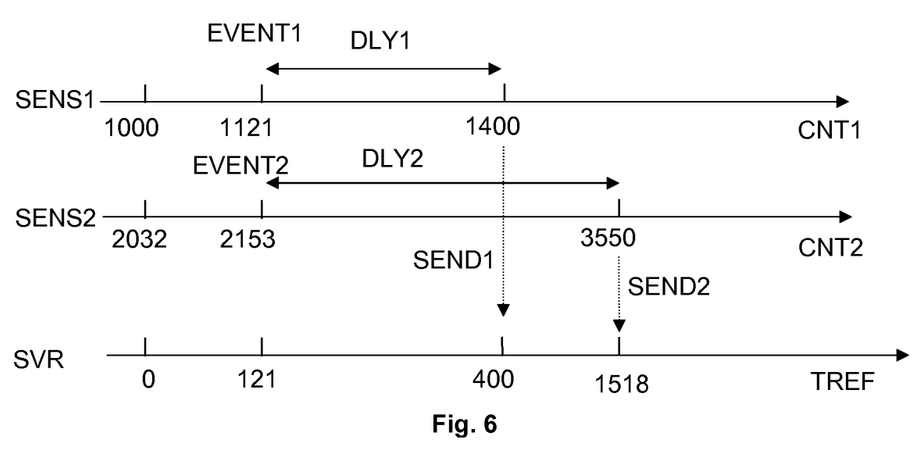
FIG. 6, illustrating a timing diagram relative to two sensors from a system according to an embodiment of the present invention, with respect to a reference time base.

FIG. 6 illustrates how the centralised server used in a system according to an embodiment of the present invention uses the timestamp information from the various sensors to work out the actual time that the timestamped events occurred or at least to relate all of the events to a single reference time base. The system comprises a first sensor, a second sensor and a centralised server connected to the two sensors via a wireless communications channel. At reference time TREF zero, according to a reference time counter TREF in the centralised server SVR, the real-time counter CNT1 in the first sensor SENS1 indicates 1000. At the same zero reference time the real-time counter CNT2 in the second sensor SENS2 indicates 2032. The first sensor SENS1 detects a movement when its counter reaches 1121 and records it as an event timestamp EVENT1 whose value corresponds to time 1121. The second sensor SENS2 detects a movement when its counter CNT2 is at 2153 and records it as an event timestamp EVENT2 whose value corresponds to time 2153. After a first delay DLY1 after the event, the first sensor sends a log comprising event timestamp EVENT1 to the server. At a second delay DLY2 after the event, the second sensor sends a log comprising event timestamp EVENT2 to the server. First and second delays are arbitrary. For example, sensors may be programmed to report their event logs to the centralised server once a day at a certain time according to their real time clocks or at any arbitrary time. The important thing is that the events at each sensor are recorded in the logs along with the corresponding times that the events occurred according to the respective real time clock of the sensor concerned. The sensor also reports the value of its real time clock to the server when it sends its log to the server. This is the send timestamp and it can either be recorded within the log or it may be otherwise associated with the log.

By subtracting an event time, as given in an event timestamp in a log, from the time that a sensor sends the log, indicated by the log's send timestamp, said sending time being expressed in terms of the sensor's time counter, the delay between the detection of the event and the sending of the log can be calculated. The event time can then be expressed in terms of the reference time by subtracting the delay from the time that the server receives the log, according to the reference time counter.

As mentioned before, the centralised server has access to a record of the locations of all of the sensors and their footprints and thus is also aware of the overlaps of the sensors' footprints. According to an embodiment, a database comprising topographic data related to the sensors and their footprints is made available to the server so that the server can work out which sensor's footprints overlap with one or more other sensors' footprints. In this particular example, each sensor's log records only one event, EVENT1 for the first sensor and EVENT2 for the second sensor. The server receives the message from the first sensor when the reference time at the server is 400. As well as receiving the event time of EVENT1, 1121, the server also receives the first sensor's time counter value at reference time 400. The time counter value for the first sensor when it sends the log is 1400. The server can then calculate the reference time of the event detected by the first sensor as EVENT1=TREF1−DLY1=400−279=121. Similarly, the server receives the message from the second sensor at reference time 1518. The second sensor provides the time it detected EVENT2, i.e. 2153 and the value of its clock at the time the message is sent, i.e. 3550. The difference is 1397. The server can then calculate the reference time of the event detected by the second sensor as EVENT2=TREF2−DLY2=1518−1397=121. Consequently, the server is able to ascertain that the events EVENT1 and EVENT2 are probably attributable to a single event detected by both sensors in the zone where the two sensors' footprints overlap. The server may thus conclude that the same movement has been detected by the two sensors.

As mentioned above, the units for the counters may be seconds or any arbitrary unit defined in the system for all of the counters. Any communication delays are in transferring messages from the sensors to the server may be neglected because they cancel out since such delays are a characteristic of the network architecture and can be taken to be substantially constant.

By topographic information, or topographic data, it is meant the physical location of the sensors within the area being monitored. This data may be given in terms of GPS coordinates. Alternatively, this data may be given relative to a layout map of the area being monitored, for example the locations of the sensors relative to geometry of the building or facility. The topographic information may further include the extent of the monitors' footprints. Such information may be location information defining the positions of the sensors, i.e. geographical information, perhaps in the form of map data, and an indication of the extent or geometric form of the footprints. Where the topographic information is only the physical location of the sensors within the area being monitored, a calculation of the extent of the monitors' footprints can be made using the sensitivity range given in the technical specification of the sensor.

A further embodiment of the present invention may use pressure-sensitive mats as motion detectors instead of, or in combination with, the above-disclosed PIRs. Pressure sensors, such as pressure-sensitive mats, can be arranged to detect a person entering a space, leaving a space or remaining present within a space. In more general terms, a pressure-sensitive mat may be arranged to detect which part of the mat a person stands on and so can detect motion of the person. This is a sufficient amount of information, along with the timestamps described above, to allow the server to function as described above. Indeed, any motion sensor which maintains anonymity of the presence detected is suitable for use in a system according to an embodiment of the present invention.

Using the information from the sensors in a system according to embodiments of the present invention, the server may generate occupancy reports for the pre-determined area concerned. For example, such a report may cover several floors of an office building, including conference rooms, workspaces, hot-desk areas, desk-sharing areas, corridors etc. The report may take the form of a heat map or an occupancy map for example, similar to a Wi-Fi coverage map, showing levels of occupancy over a given time as differently coloured zones depending on their percentage occupancy.

The invention claimed is:

1. A system for monitoring a state of occupancy of a pre-determined area by at least one live presence, the system comprising:
    a first sensor comprising a first time counter, the first sensor being configured to detect at least one movement of a live presence within a first pre-determined zone within the pre-determined area and being further configured to maintain a first log comprising, for each movement detected by the first sensor, a corresponding first event timestamp having a value which is based on a value of the first time counter when said movement within the first pre-determined zone is detected;
    at least one second sensor comprising a second time counter, the second sensor being configured to detect at least one movement of a live presence within a second pre-determined zone within the pre-determined area and being further configured to maintain a second log comprising, for each movement detected by the second sensor, a corresponding second event timestamp having a value which is based on a value of the second time counter when said movement within the second pre-determined zone is detected; and
    a server configured to receive the first and second logs via a wireless communications network, the first and second sensors further configured to attach or otherwise insert, respectively, a first and a second send timestamp to their corresponding logs, the first and second send timestamps having values derived from their respective time counters when the respective logs are sent, the server being further configured to analyze the first and second logs to provide the state of occupancy of the pre-determined area;

wherein:
the first sensor and the second sensor are battery-operated passive infra-red motion sensors; and
the server has access to a reference time counter and to topographic information concerning at least the first and second pre-determined zones, the first, second and reference time counters being configured to count at substantially a same frequency; and
wherein said analysis by the server includes combining the topographic information of the first and second pre-determined zones and the timestamps synchronised according to the reference time counter.

2. The system according to claim 1, wherein:
the server is configured to calculate the first event timestamp value and the second event timestamp value in terms of the reference time.

3. The system according to claim 2, wherein the server is configured to:
subtract the values of a first send timestamp from the first event timestamp to get a first delay time value;
subtract the values of a second send timestamp from the second event timestamp to get a second delay time value;
calculate a first event time value in terms of the reference time by subtracting the first delay time value from the first send timestamp value according to the reference time counter;
calculate a second event time value in terms of the reference time by subtracting the second delay time value from the second send timestamp value according to the reference time counter.

4. The system according to claim 3, wherein the server is configured to consider equal first and second event time values, in terms of the reference time, as corresponding to a same movement of a same live presence if said analysis of the topographic information indicates that the second pre-determined zone at least partly overlaps with the first pre-determined zone.

5. The system according to claim 3, wherein the server is configured to consider equal first and second event time values, in terms of the reference time, as corresponding to different movements of different live presences if said analysis of the topographic information indicates that the second pre-determined zone and the first pre-determined zone do not overlap with each other.

6. The system according to claim 3, wherein the server is configured to consider different first and second event time values, in terms of the reference time, as corresponding to different movements of different live presences.

7. The system according to claim 1, wherein the first and second sensors are placed on a ceiling or ceilings.

8. The system according to claim 1, wherein the server has access to a database storing physical layout data related to the pre-determined area and/or the first and second pre-determined zones, said physical layout data being the topographic information.

9. A method for monitoring a state of occupancy of a pre-determined area, the method comprising:
receiving a first report of a time when a movement was detected within a first pre-determined zone within the pre-determined area from a first sensor, the first sensor being a battery-operated passive infra-red motion sensor, the first report including a time when the movement was detected according to a local real-time clock of the first sensor and a message delivery time for the first report according to the local real-time clock of the first sensor;
receiving a second report of a time when a movement was detected within a second pre-determined zone within the pre-determined area from a second sensor, the second sensor being a second battery-operated passive infra-red motion sensor, the second report including a time when the movement was detected according to a local real-time clock of the second sensor and a message delivery time for the second report according to the local real-time clock of the second sensor;
comparing the message delivery time for the first report with a reference clock and using the comparison to calculate the time that the movement was detected by the first sensor in terms of the reference clock;
comparing the message delivery time for the second report with the reference clock and using the comparison to calculate the time that the movement was detected by the second sensor in terms of the reference clock;
verifying, in a database having topographic data on the first and second pre-determined zones, whether the first and second sensors have overlapping footprints; and
attributing the two movements to be a single movement by a same live presence if the two movements have the same time in terms of the reference clock and if the two footprints have an overlap;
attributing the two movements to be two separate movements by two separate live presences if the two movements have the same time in terms of the reference clock and if the two footprints do not overlap; and
attributing the two movements to be separate movements by different live presences if the two movements have different times in terms of the reference time;
wherein the first, second and reference time counters are configured to count at substantially a same frequency.

10. The method according to claim 9, further including building an occupancy map, the method further comprising:
for two or more sensors having a common overlap of footprints and providing logs containing a same event time value according to the reference time counter, attributing one movement at the overlap of said footprints;
for two or more sensors not having a common overlap of footprints and providing logs containing a same event time value according to the reference time counter, attributing one movement in each of said footprints;
for two or more sensors having a common overlap of footprints and providing logs containing different event time values according to the reference time counter, attributing one movement per event in each of the corresponding footprints away from any overlaps between the two or more footprints; and
generating a map covering the pre-determined area, the map showing the number of thus attributed movements at their respective locations.

11. The method according to claim 10, further comprising using the event time values to illustrate an evolution over time of the movements on the map.

* * * * *